United States Patent [19]

Shiba et al.

[11] Patent Number: 4,748,529
[45] Date of Patent: May 31, 1988

[54] MAGNETIC TAPE CASSETTE WITH ANTI-FRICTION TAPE GUIDES

[75] Inventors: Haruo Shiba, Komoro; Kimio Tanaka, Saku, both of Japan

[73] Assignee: TDK Corporation, Tokyo, Japan

[21] Appl. No.: 862,867

[22] Filed: May 13, 1986

[30] Foreign Application Priority Data

Jun. 3, 1985 [JP] Japan ................................. 60-83754

[51] Int. Cl.⁴ ............................................ G11B 23/08
[52] U.S. Cl. ..................................... 360/132; 242/199
[58] Field of Search ....................... 360/132, 133, 134, 130.1–130.34; 242/197–200

[56] References Cited

U.S. PATENT DOCUMENTS

| 3,861,621 | 1/1975 | Takeichi et al. | 242/199 X |
| 4,097,006 | 6/1978 | Saito | 242/199 |
| 4,291,800 | 9/1981 | Okamura et al. | 206/389 X |
| 4,476,510 | 10/1984 | Hoover | 360/132 |
| 4,496,118 | 1/1985 | Oishi et al. | 242/198 |
| 4,566,653 | 1/1986 | Bettinger et al. | 242/199 |
| 4,572,462 | 2/1986 | Inkel | 242/199 |
| 4,618,904 | 10/1986 | Manning | 360/130.21 X |

FOREIGN PATENT DOCUMENTS 55-79488  5/1980  Japan.
59-20487  2/1984  Japan.

Primary Examiner—John H. Wolff
Attorney, Agent, or Firm—Seidel, Gonda, Goldhammer & Abbott

[57] ABSTRACT

A magnetic tape cassette including a lower housing section and an upper housing section assembled into a housing, a pair of reels held in the housing and carrying a length of magnetic tape wound thereon, and at least one magnetic tape guide wall provided at the front of the housing, characterized in that said at least one magnetic tape guide wall is formed in one piece with said lower housing section in such a relation that the magnetic tape guiding surface is substantially perpendicular to the outer bottom surface of said lower housing section and that said guiding surface is a matt surface.

1 Claim, 5 Drawing Sheets

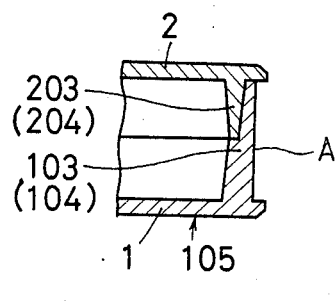
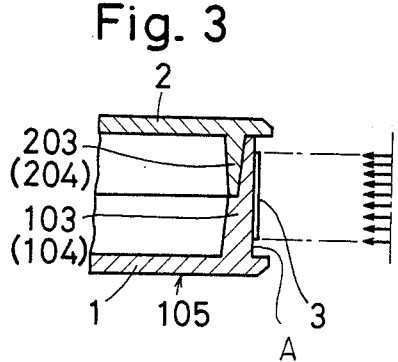
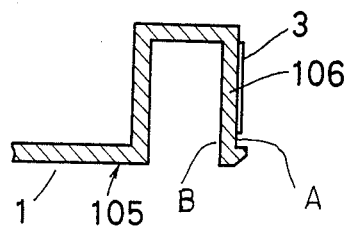
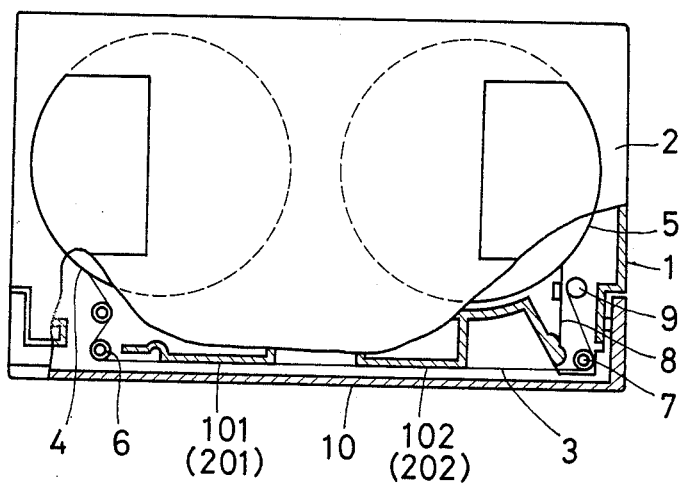

Fig. 4
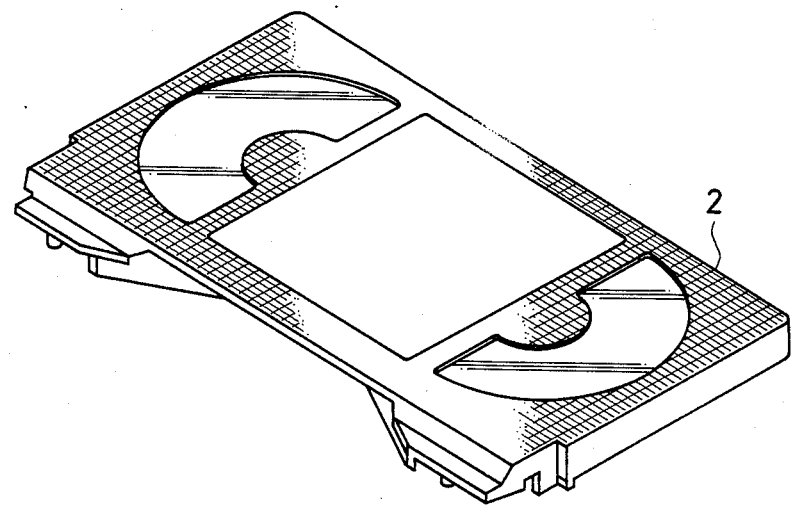
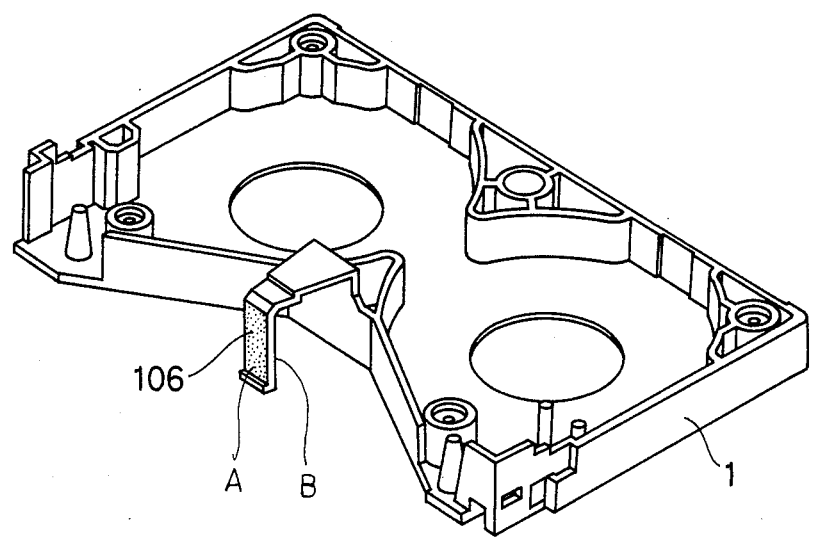

MAGNETIC TAPE CASSETTE WITH ANTI-FRICTION TAPE GUIDES

FIELD OF INDUSTRIAL APPLICABILITY

This invention relates to a magnetic tape cassette such as a video tape cassette. It provides a cassette in which a magnetic tape guide wall or walls at the front of the assembled housing are formed in one piece with the lower housing section so that the magnetic tape guiding surface or surfaces are approximately perpendicular to the outer bottom surface of the housing section, and the guiding surface or surfaces are matted. Consequently, the force of electrostatic attraction produced between the guiding surface or surfaces and the magnetic tape running past them is made equal over the entire width of the tape and the frictional resistance on contact between the magnetic tape and the guiding surfaces is lowered.

PRIOR ART

A conventional magnetic tape cassette of the character comprises, as shown in FIG. 6, an assembled casing or housing made up of a lower housing section 1 and an upper housing section 2, a pair of reels 4, 5 held in the assembled housing and carrying a length of magnetic tape 3 wound thereon to run from reel to reel, and tape guides 6, 7 around which the magnetic tape 3 is guided to extend over and run across the front of the housing. Numeral 8 designates a tape pad located adjacent the reel on the supply side, 9 designates a guide pole which coacts with the tape pad 8 to press the magnetic tape 3 on both sides to keep it taut, and 10 designates a protection lid which protects the magnetic tape extended and driven across the front of the housing. The protection lid 10 is swingably pivoted at the both ends to the front parts of the both side edge walls of the housing.

As shown in FIG. 7, the lower housing section 1 and upper housing section 2 have matching pairs of half-width portions or magnetic tape guide wall portions 101, 102 and 201, 203, respectively. When the lower and upper housing sections 1, 2 are mated to form the housing, as illustrated in FIG. 8, the magnetic tape guide wall portions 101 and 201, and likewise 102 and 202, in opposing pairs, come in contact to constitute magnetic tape guide walls 101-201 and 102-202, respectively, both of a width slightly greater than the width of the magnetic tape 3. Between the tape guides 6 and 7, the magnetic tape 3 passes across the front of the assembled housing, along the outer surfaces (A) of the magnetic tape guide walls 101-201 and 102-202 as guiding surfaces. Since the lower housing section 1 and upper housing section 2 are molded of plastic material, the inner and outer sides of their magnetic tape guide wall portions 101, 102 and 201, 202 are tapered, as shown in FIG. 8, in conformity with the drafts of the molds used for releasing these housing sections 1, 2.

PROBLEMS TO BE SOLVED BY THE INVENTION

As described above, the conventional magnetic tape cassette has pairs of half-width magnetic tape guide wall portions 101, 102 and 201, 202 formed, respectively, on its lower and upper housing sections 1, 2, in such a manner that when the two housing sections are joined the corresponding half guide portions of the opposing pairs too are combined to form complete magnetic tape guide walls 101-201 and 102-202. Therefore, the guiding surfaces (A) constituted by the outer surfaces of the magnetic tape guide walls 101-201 and 102-202 are not exactly flat but tend to be concaved or stepped. The magnetic tape that passes in front of the guiding surfaces (A) does so in sliding contact with the surfaces (A) because of attraction due to static charge accumulation on running. Consequent ununiformity in the distribution of pressure applicable to the magnetic tape 3 leads to scraping, deformation with irregular elongation, or other damage of the tape.

As noted above in connection with FIG. 8, the inner and outer sides of the magnetic tape guide wall portions 101, 102 and 201, 202 are tapered correspondingly to the drafts of the molds used for the lower and upper housing sections 1, 2. The guiding surfaces (A) for the magnetic tape are, therefore, slightly recessed halfway in the width direction of the tape. When the tape 3 is caused to run, as shown in FIG. 9, in sliding contact with the guiding surfaces (A) by dint of the electrostatic attraction, the pressure distribution over the tape is such that more pressure is applied toward the both edges 3a, 3b than at the midpoint. The result is that, as shown developed in FIG. 10, the magnetic tape 3 is extended to excess along the both edges 3a, 3b like fringes or scraped or otherwise impaired edgeways.

Also, when the reels 4, 5 tension the magnetic tape 3 excessively, the tape again runs in intimate sliding contact with the guiding surfaces (A), curled to the contour of the latter. The magnetic tape 3, made of plastic as are the lower and upper housing sections 1, 2, is statically charged as it runs in close contact with the guiding surfaces. The static buildup combines with those of the guiding surfaces to increase the mutual attraction until the tape is brought to a stop or other trouble occurs.

The problems described above can arise particularly when the magnetic tape 3 is driven fast, for example for cue or review purposes.

MEANS FOR SOLVING THE PROBLEMS

With the view to solving the foregoing problems of the prior art, the present invention provides a magnetic tape cassette including a lower housing section and an upper housing section assembled into a housing, a pair of reels held in the housing and carrying a length of magnetic tape wound thereon, and a magnetic tape guide wall or walls provided at the front of the housing, characterized in that the magnetic tape guide wall or walls are formed in one piece with the lower housing section in such a relation that the magnetic tape guiding surfaces are approximately perpendicular to the outer bottom surface of the lower housing section and that the guiding surfaces are finely roughened to form a matt surface. Preferably, the mat surface or surfaces have a surface roughness between 10 $\mu$mRZ and 30 $\mu$mRZ as measured according to Japanese Industrial Standard.

FUNCTIONS

The magnetic tape cassette according to the present invention has a magnetic tape guide wall or walls at the front of the assembled housing, formed in one piece with the lower housing section in such a manner that the magnetic tape guiding surface or surfaces are approximately perpendicular to the outer bottom surface of the housing section. Thus, the guiding surface of each magnetic tape guide wall forms a flat plane without any seam or joint. The outer bottom surface of the lower housing section constitutes a stable reference plane of the cassette when the cassette is slipped in an apparatus for recording or playback, such as a tape deck, and also constitutes a stable reference plane dictating the dimensions of the housing components. Therefore, the construction in which the magnetic tape guide wall or walls are formed in a relation approximately perpendicular to the outer bottom surface of the lower housing section that constitutes the stable reference plane, enables the magnetic tape to be in contact face-to-face and generally in parallel with the guiding surface or surfaces. The pressure applied by each guiding surface to the magnetic tape is equalized over the entire width of the tape, with the result that scraping, edgewise elongation, or other trouble of the tape is avoided and the tape is positively protected against damage even when running at high speed.

The construction described above could invite frequent electrostatic sticking of the tape during the high speed run. In order to solve this problem, the present invention roughens each magnetic tape guiding surface. In this way the frictional resistance on contact between the guiding surface and the tape is reduced to a level low enough to preclude electrostatic sticking and avoid scraping, deformation, and stopping of the running tape.

BRIEF DESCRIPTION OF THE DRAWINGS

FIG. 2 is an end view illustrating the combination of the lower and upper housing sections; FIG. 3 is a view indicating the pressure distribution with respect to the magnetic tape; FIG. 4 is a perspective view of another embodiment of the invention, illustrating the lower and upper housing sections; FIG. 5 is a sectional view of essential parts of the second embodiment; FIG. 6 is a plan view, partly broken away, of a conventional magnetic tape cassette; FIG. 8 is a view indicating the pressure distribution with respect to the magnetic tape.

EMBODIMENTS

Figure 1:
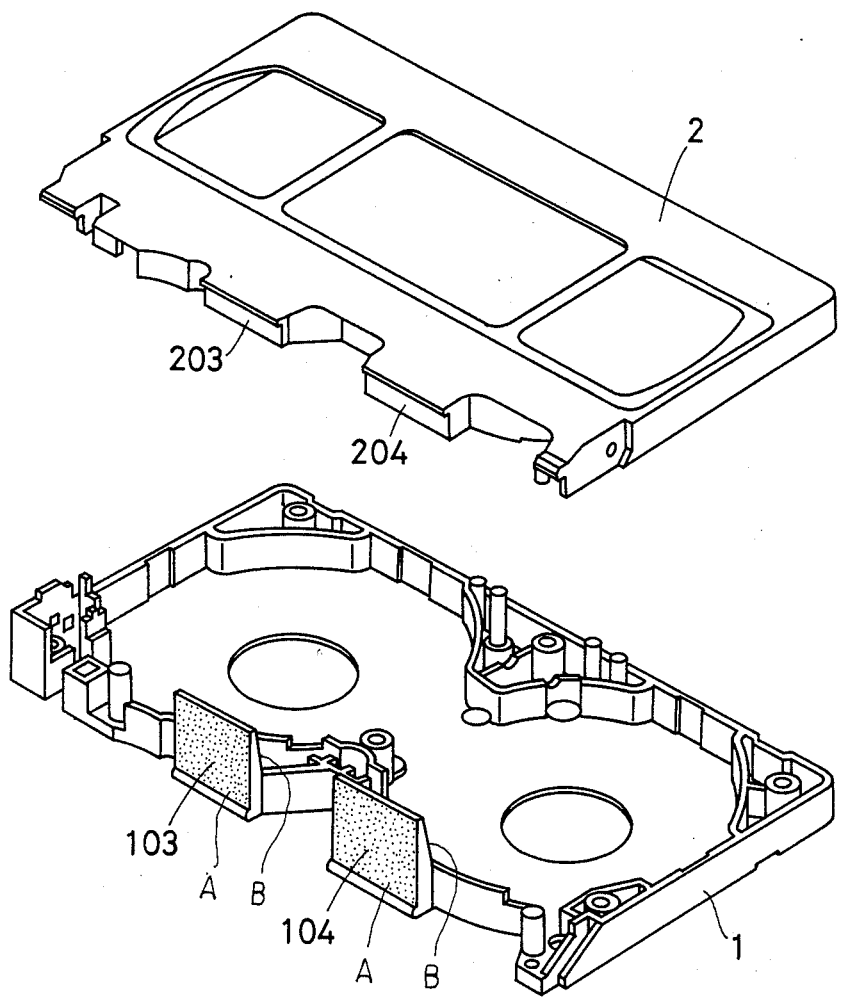
FIG. 1 is a perspective view of lower and upper housing sections that form the housing of a magnetic tape cassette embodying the invention.
Figure 7:
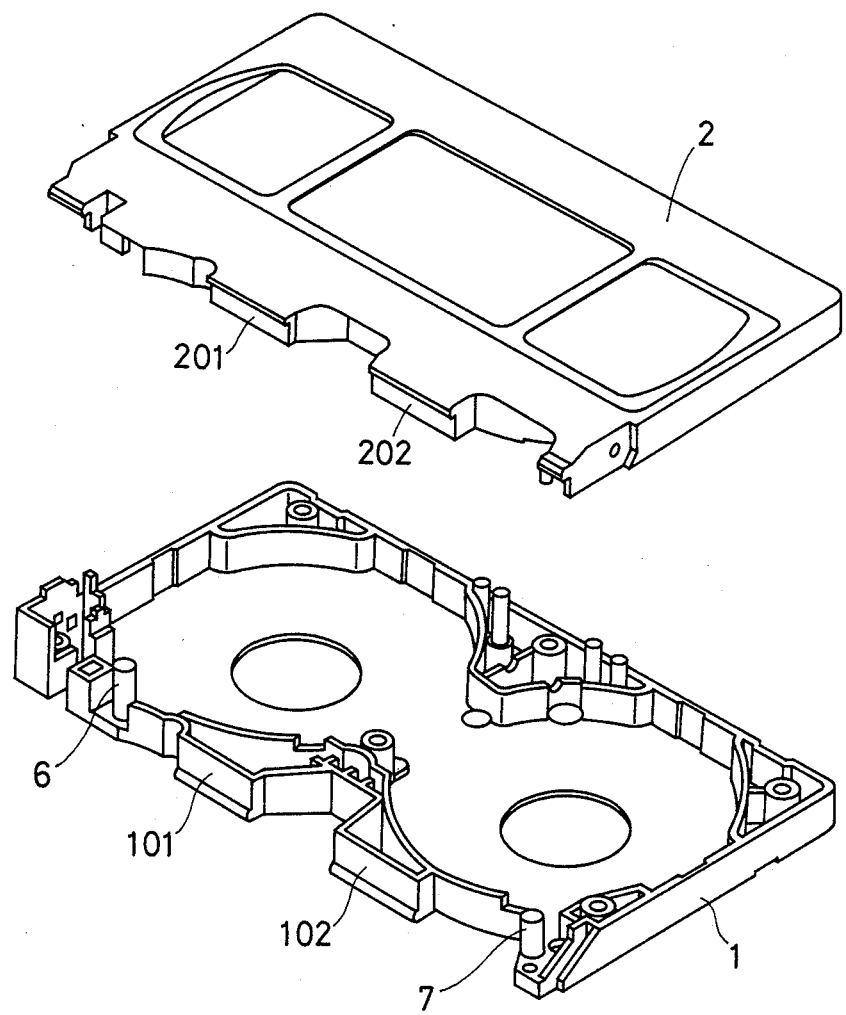
FIG. 7 is a perspective view of the lower and upper housing sections of the conventional cassette.
Figure 8:
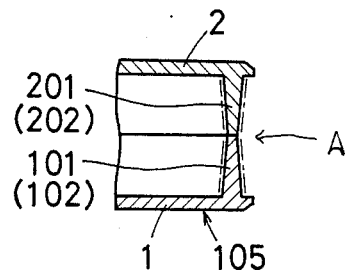
FIG. 8 is an end view of the combination of the lower and upper housing sections.
Figure 9:
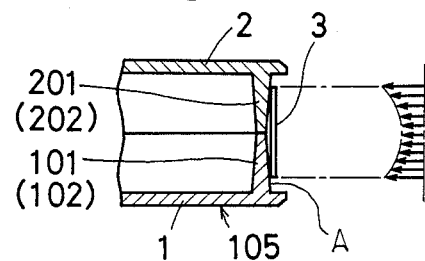
Figure 10:
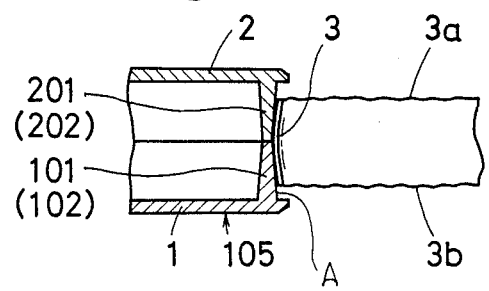
FIG. 10 is a view similar to FIG. 9 but illustrating problems to be encountered.

FIG. 1 is a perspective view of a lower housing section 1 and a upper housing section 2 which, when combined together, form the housing of a magnetic tape cassette embodying the present invention. FIG. 2 is an end view of the lower and upper housing sections 1, 2 mated. This embodiment, representing a magnetic tape cassette of the VHS system, has two magnetic tape guide walls 103, 104 formed in spaced relation on the same plane at the front of the lower housing section 1, in one piece with the section. The upper housing section 2 does not have such tape guide wall but is formed only with backing portions 203, 204 to back up, respectively, the magnetic tape guide walls 103 and 104 of the lower housing section 1. Thus, in the construction shown, the lower housing section 1 alone has the magnetic tape guide walls 103, 104.

The magnetic tape guide walls 103, 104 are formed in one piece with the lower housing section 1, in such a positional relation that their outer sides, or guiding surfaces (A), extend upwardly at approximately right angles to the outer bottom surface of the lower housing section 1. The inner sides (B) of the magnetic tape guide walls 103, 104 are tapered in conformity with the drafts of the mold used.

The outer bottom surface 105 of the lower housing section 1 constituting a stable reference plane, the magnetic tape 3 comes in contact face-to-face and generally in parallel with the guiding surfaces (A). As FIG. 3 indicates, the pressure applied by each guiding surface (A) to the magnetic tape 3 is equal over the entire width of the tape. The tape is prevented, therefore, from being scraped or irregularly elongated. It is also protected against damage due to high speed running at fast forward or reverse motion or the like.

The guiding surfaces (A) for the magnetic tape are matted over the almost entire area by a satin finish. Accordingly, the practical guiding area, or area of contact, between each guiding surface (A) and the magnetic tape 3 is reduced in proportion to the degree to which the guiding surface is matted. The resistance of contact friction between the two is reduced and, even if electrostatic attraction takes place, the magnetic tape 3 is kept from running improperly. The degree of matt is desired to be in the range of about 10 to 30 $\mu$m RZ in terms of the surface roughness. If the roughness is below 10 $\mu$m RZ, the surface attains a nearly mirror finish and causes the magnetic tape 3 to be in closer contact with the guiding surfaces (A), with the danger of damaging the tape because of electrostatic sticking. Conversely if the roughness is beyond 30 $\mu$m RZ, the surface tends to damage the tape by scraping or other harmful action.

Techniques for preventing the magnetic tape from damage caused by electrostatic sticking are known by, for example, Japanese Utility Model Kokai Nos. 59-20487, 52-100727, 50-125056, etc., in which a number of ridges or embosses are formed on the guide surface or surfaces which contact a magnetic tape to prevent the electrostatic sticking phenomenon. However, the drawbacks of them are that the magnetic tape is brought into contact with the top surfaces of the ridges or embosses with increased frictional force, with the result that the tape surface is rubbed with such increased force, leading to unstable running and local scratches in the longitudinal direction.

In contrast, in the present invention the guide surface A are matted or frosted so that the contact of the magnetic tape 3 with the guide surfaces will be a surface contact and the frictional resistance to the tape in the transverse direction will be substantially uniform. By this, the frictional resistance is reduced and stabilized to remarkably lessen damage to the magnetic tape 3, compared with the conventional technique wherein ridges are utilized.

FIG. 4 shows another embodiment of the present invention as applied to a magnetic tape cassette of the Beta format system. The lower housing section 1 is formed integrally with a magnetic tape guide wall 106 at its front end. The outer surface of the guide wall that serves as a guiding surface (A) is matted to a satin finish. As shown in FIG. 5, the magnetic tape guide wall 106 is formed in one piece with the lower housing section 1 in such a manner that its guiding surface (A) is approximately perpendicular to the outer bottom surface 105 of the housing section.

It should be clear to those skilled in the art that this embodiment achieves functions and effects similar to those of the embodiment illustrated in FIGS. 1 to 3.

ADVANTAGES OF THE INVENTION

As described hereinbefore, the magnetic tape cassette of the present invention has a magnetic tape guide wall or walls formed at the front of the assembled housing, in one piece with the lower housing section in such a manner that the guiding surface or surfaces are approximately perpendicular to the outer bottom surface of the lower housing section. The guiding surface of each magnetic tape guide wall is flat without any seam or joint and allows the magnetic tape to come in contact face-to-face and generally in parallel with the guiding surface. The pressure that the guiding surface applies to the magnetic tape is made uniform over the entire width of the tape, with the consequence that the tape is kept from scraping, irregular elongation, or other deformation and is positively protected against damage while running at high speed as well as at ordinary speed.

The afore-described construction is combined with roughening of each guiding surface to reduce the frictional resistance on contact between the guiding surface and the magnetic tape to a level low enough to preclude electrostatic sticking or damage to the tape.

What is claimed is:

1. A magnetic tape cassette including a lower housing section and an upper housing section assembled into a housing, a pair of reels held in the housing and carrying a length of magnetic tape wound thereon, and at least one magnetic tape guide wall provided at the front of the housing, said at least one magnetic tape guide wall being formed in one piece with said lower housing section in such a relation that the magnetic tape guiding surface is substantially perpendicular to the outer bottom surface of said lower housing section and that said guiding surface is a matt surface having a surface roughness between 10 $\mu$m RZ and 30 $\mu$m RZ, whereby electrostatic sticking, scraping, deformation and stoppage of the tape is reduced.

* * * * *